United States Patent [19]
Burt

[11] 3,945,594
[45] Mar. 23, 1976

[54] CABLE TENSION RELIEVERS

[75] Inventor: David A. Burt, Didcot, England

[73] Assignee: ITW Limited, Slough, England

[22] Filed: Oct. 1, 1973

[21] Appl. No.: 400,588

[30] Foreign Application Priority Data
Sept. 27, 1972 United Kingdom............... 44698/72

[52] U.S. Cl. ............... 248/74 A; 24/73 AP; 248/56; 248/73; 248/74 PB; 339/107
[51] Int. Cl.² ............................................. F16L 5/00
[58] Field of Search ............ 248/56, 73, 74 R, 74 B, 248/74 PB, 74 A; 339/103 B, 103 C, 103 M, 106, 107, 97 R; 174/65 G, 152 G, 153 G; 24/73 SA, 73 AP, 73 PB, 255 BS, 255 C, 129 R, 81 CR; 16/2

[56] References Cited
UNITED STATES PATENTS

| | | | |
|---|---|---|---|
| 1,300,994 | 4/1919 | Moise............................... | 24/81 CR |
| 1,817,776 | 8/1931 | Sipe.................................. | 24/255 BS |
| 2,333,869 | 11/1943 | Larkin........................... | 24/81 CR X |
| 3,030,601 | 4/1962 | Krebs.............................. | 339/107 X |
| 3,197,556 | 7/1965 | Simon............................ | 174/153 G |
| 3,286,963 | 11/1966 | Bergman.......................... | 248/74 A |
| 3,288,407 | 11/1966 | Downer et al. ........................ | 248/56 |
| 3,296,669 | 1/1967 | Elder................................ | 24/129 R |
| 3,316,523 | 4/1967 | Trangmar ....................... | 339/107 X |
| 3,351,974 | 11/1967 | Wilhelmi..................... | 174/153 G X |
| 3,516,111 | 6/1970 | Heyman................................. | 16/2 |
| 3,548,079 | 12/1970 | Jones et al. ...................... | 174/153 G |
| 3,683,319 | 8/1972 | Vigeant et al. .................... | 339/97 R |
| 3,689,014 | 9/1972 | Fink...................................... | 248/56 |
| 3,784,961 | 1/1974 | Gartland ........................... | 339/107 |

FOREIGN PATENTS OR APPLICATIONS

| | | | |
|---|---|---|---|
| 1,575,253 | 2/1967 | Germany........................... | 24/73 AP |
| 1,022,820 | 3/1966 | United Kingdom............... | 24/73 PB |
| 1,226,569 | 3/1971 | United Kingdom............... | 248/74 A |
| 815,688 | 7/1959 | United Kingdom............... | 174/153 G |

*Primary Examiner*—Roy D. Frazier
*Assistant Examiner*—Rodney H. Bonck
*Attorney, Agent, or Firm*—Jack R. Halvorsen; Robert W. Beart

[57] ABSTRACT

A cable clamp which is a one piece plastics moulding, grips by two pairs of wings, and independently resists both pushing and pulling of the cable because the two pairs incline in opposite directions. The cable is slid along the gripping edges of the wings when being applied to the clamp, and the wings do not bend or crimp the cable. The clamp can have an integral closeable lid and a fastener for anchoring to an apertured support.

3 Claims, 3 Drawing Figures

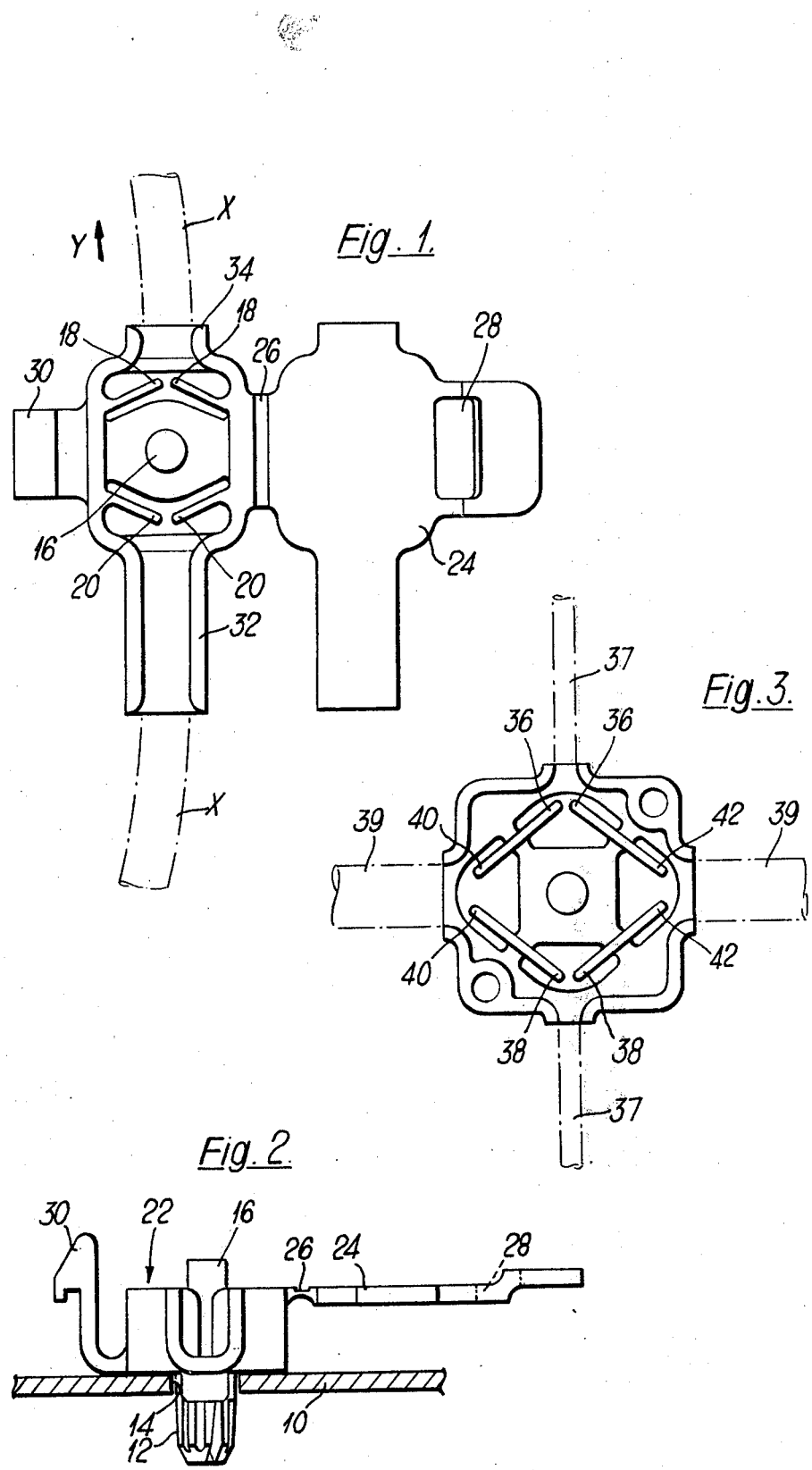

CABLE TENSION RELIEVERS

This invention concerns cable clamps.

A cable clamp is a device which can be anchored adjacent to a panel and can clamp a cable passing through an aperture in the panel. Usually the panel is the exterior wall of an electrical appliance such as a cooker, refrigerator or television, and the clamp is anchored to strong frame members concealed by the panel. When moving the appliance around, or when children are playing, the cable can be subjected to tension or pushing, either gradual or sudden, which would be sufficient to wrench the cable from electrical terminals to which it connects inside the appliance. A cable clamp fastens the cable to the frame member, and there is a length of slack cable between the clamp and the terminals whereby any tension exerted on the cable outside the appliance is carried by the clamp and the frame member and is not transmitted to the terminals.

According to the present invention a cable clamp is a one-piece plastics moulding and comprises first and second pairs of flexible gripping wings, the two wings of each pair being opened from one another by the action of pushing a cable along their gripping edges to be gripped between them; during their opening actions the first pair of wings deflecting towards one end of the clamp, and the second pair towards the opposite end.

A cable clamp constructed in accordance with this invention is described below with reference to the accompanying drawings, in which:

FIG. 1 is a plan of the clamp in its "as moulded" condition, two portions of a cable lying adjacent to the clamp being shown in the position for application to the clamp;

FIG. 2 is an end view of the clamp, taken in the direction indicated by the arrow y seen in FIG. 1, but the clamp having been applied to a frame member ready for anchoring; and FIG. 3 is a diagrammatic view of an alternative arrangement for certain parts of the clamp.

In use, the clamp is first anchored to a frame member 10 such as a bracket or beam within the appliance, by passing a shank 12 which projects from an undersurface of the clamp, as viewed in FIG. 2, through an aperture 14 in the frame member 10. It is to be understood that although the member 10 is shown horizontal, and this description is appropriate to that, the member could lie in any other attitude at all, as far as the present invention is concerned. The shank has three legs defining between them a downwardly converging bore. A pin 16 lies coaxially with the upper end of the bore and connects to the legs by thin webs which are sheared by driving the pin 16 axially downwards to force the pin to lie within the bore and hold the legs divergent. This form of anchoring is known, and could be replaced by mechanically equivalent anchorings which might be more appropriate to differen applications.

The cable is then laid over the clamp, in the position indicated diagrammatically in FIG. 1 by the two spaced portions X which are portions lying just outside the clamp. The cable is then forced down into the clamp. This involves forcing the cable between the free, gripping edges of a first pair of wings 18 near the one end of the clamp, and those of a second pair of wings 20 lying near to the opposite end of the clamp. Each of the wings is integrally formed to project from a thick wall defining the general hollow body of the clamp. Each pair converges obliquely towards its adjacent end. FIG. 1 shows the relaxed condition of the wings 18 and 20. When the cable is forced down between the gripping edges the wings obviously lie opened out and much further apart so that they grip the cable firmly. When the cable has been pressed down between the pairs of wings it lies below the surface of the clamp indicated at 22 in FIG. 2. A lid 24 can then be hinged through an interconnecting plastic hinge 26 to overlie the cable and the wings. A slot 28 in the lid fastens over a hook 30 formed on a cantilever projection on the far side of the body of the clamp. Surrounding the portions of the cable adjacent to the wings are tubular portions, shown as 32 and 34. In use, the tube 32 passes through an aperture in the panel of the appliance, giving a neat seal and preventing the cable or a tool from being pushed between the panel and the clamp. The tube 34 is principally for styling, to conceal the wings 18. The lid 24 has substantially the same outline as the body of the clamp.

If a force is exerted on the cable in the direction of the arrow Y it is resisted by the wings 20 because the friction between the cable and the wings would tend to pull the wings inwards towards one another and grip the cable more tightly. A force in the direction of the arrow Y could be caused by pulling of the the upper part of the cable seen in FIG. 1, away from the clamp, or by a pushing on the lower part of the cable as viewed, towards the cable clamp.

Similarly, a pulling on the lower part of the cable would be resisted by the wings 18, and a pushing by the wings 20.

It has been found that existing cable clamps which for many years have been required by British Standards to withstand pulling, have been so successful that children now try to push the cables, and a new safety requirement is being enacted whereby cable clamps must withstand pushing as well as pulling.

The design of cable clamp described has the advantage that it can be moulded integrally in a two-plate mould, and can be of plastics material. Nylon 66 is suitable.

It is possible to incorporate the present invention in a clamp which can accomodate a wide range of sizes of cable. FIG. 3 shows merely portions of such a clamp. There are eight different wing ends, which in this case are the two ends of each of four wings, but could be the ends of eight seperate wings. The two pairs of wing ends 36 and 38 hold a cable of fairly small diameter, two portions of which are shown as 37. The pairs of wing ends 40 and 42 have much greater spaces between them and grip a larger cable shown as 39. The clamp can be mounted on the frame member to lie in either of two perpendicular directions to accomodate the appropriate cable. This arrangement halves the number of clamps required to be kept in stock to clamp a range of cable diameters.

Each pair of wings, in the clamps described, grips the cable by mere pressure, rather than bending or crimping as in the prior art. This is less damaging to the cable insulation. The clamping pressure is in the direction perpendicular to that in which the lid is applied to the body, making the strength of the grip predictable rather than depending on the throughness of whoever assembles the appliance.

What I claim:

1. A one-piece plastic cable clamp including a housing having a generally rectangular base and an upstanding wall around the perimeter of said base providing a pair of end walls and a pair of side walls, a slot-like opening having a predetermined dimension in each end wall in alignment with the opposite opening, a slot-like opening having a predetermined opening greater than the other mentioned openings in each side wall in alignment with the opposite opening, at least four flexible gripping wings within said housing each wing supported intermediate its length to provide a gripping free edge at opposite extremities of each wing and positioned angularly between adjacent end and side walls and the free ends of the wings converging obliquely with the next adjacent gripping wing towards the opening in its adjacent end or side wall, each of said adjacent pairs of said wings being positioned generally normal to said base with the free ends of the wings providing gripping edges initially spaced from the next adjacent wing a distance less than the thickness of a cable to be accepted therebetween and to be deflected by said cable when inserted between the free edges of said adjacent wings, the ends of each two adjacent wings being opened from one another by the action of laying the cable into the housing and pushing the cable along their gripping edges, to be gripped therebetween and to extend continuously through each of the opposite wall openings whereby during their opening action adjacent pairs of wings deflect towards the slot in the adjacent wall while the second pair of wings deflect toward the opposite wall thereby preventing movement of said cable in either direction, said clamp being capable of gripping a cable of a predetermined first diameter that is acceptable within said predetermined dimension of the slotlike opening in the end wall while the opposite ends of said gripping wings are capable of accepting a cable having a predetermined dimension greater than the first dimension and lies in a direction transversely to the position that would be assumed by the first mentioned cable to thereby permit usage of the cable clamp with individual grips having differing diameters.

2. A cable clamp according to claim 1 in which there is a fastener projecting therefrom and permitting the clamp to be anchored to an apertured surface.

3. A cable clamp according to claim 1 in which the housing converges at least at one of its ends or side walls to define a tubular portion which closely surrounds a cable passing through the clamp.

* * * * *